United States Patent
Ding et al.

(10) Patent No.: US 9,892,249 B2
(45) Date of Patent: Feb. 13, 2018

(54) METHODS AND DEVICES FOR AUTHORIZING OPERATION

(71) Applicant: Xiaomi Inc., Beijing (CN)

(72) Inventors: Liang Ding, Beijing (CN); Bolin Huang, Beijing (CN); Jiajin Yin, Beijing (CN)

(73) Assignee: Xiaomi Inc., Beijing (CN)

( * ) Notice: Subject to any disclaimer, the term of this patent is extended or adjusted under 35 U.S.C. 154(b) by 60 days.

(21) Appl. No.: 14/799,379

(22) Filed: Jul. 14, 2015

(65) Prior Publication Data

US 2016/0092668 A1 Mar. 31, 2016

Related U.S. Application Data

(63) Continuation of application No. PCT/CN2015/074517, filed on Mar. 18, 2015.

(30) Foreign Application Priority Data

Sep. 29, 2014 (CN) .......................... 2014 1 0515402

(51) Int. Cl.
*G06F 21/35* (2013.01)
*G06F 21/34* (2013.01)
(Continued)

(52) U.S. Cl.
CPC .............. *G06F 21/35* (2013.01); *G06F 3/017* (2013.01); *G06F 21/34* (2013.01); *H04L 63/0853* (2013.01); *H04W 12/06* (2013.01); *G06F 1/163* (2013.01); *G06F 2221/2101* (2013.01); *G06F 2221/2111* (2013.01)

(58) Field of Classification Search
CPC ........ G06F 1/163; G06F 1/1694; G06F 21/34; G06F 3/017; G06F 21/35; H04W 12/06; H04L 63/0853

See application file for complete search history.

(56) References Cited

U.S. PATENT DOCUMENTS

| | | | |
|---|---|---|---|
| 7,352,996 | B2 | 4/2008 | Kumar |
| 7,571,468 | B1 | 8/2009 | Williams |

(Continued)

FOREIGN PATENT DOCUMENTS

| | | | |
|---|---|---|---|
| CN | 101399726 A | | 4/2009 |
| CN | 103516726 A | | 1/2014 |

(Continued)

OTHER PUBLICATIONS

Notice of Allowance and English translation for Japanese patent application No. 2016-550936 dated Jul. 6, 2017, 6 pages.

(Continued)

*Primary Examiner* — Tae Kim

(57) ABSTRACT

A system for authorizing an operation is provided. The system may acquire motion data collected by a wearable device. A mobile terminal may determine whether the motion data matches with a physical motion for verification. If the motion data matches with the physical motion for verification, the mobile terminal may be authorized to perform a predetermined operation corresponding to the physical motion for verification. Thus, a user's identity may be verified based on the wearable device that collects motion data.

16 Claims, 12 Drawing Sheets

(51) Int. Cl.
*H04L 29/06* (2006.01)
*H04W 12/06* (2009.01)
*G06F 3/01* (2006.01)
*G06F 1/16* (2006.01)

(56) References Cited

U.S. PATENT DOCUMENTS

| | | | | |
|---|---|---|---|---|
| 8,928,587 | B1* | 1/2015 | Smus | H04W 4/006 |
| | | | | 345/156 |
| 9,436,165 | B2* | 9/2016 | Narendra | G05B 1/03 |
| 9,448,543 | B2* | 9/2016 | Narendra | G05B 1/03 |
| 2003/0184430 | A1 | 10/2003 | Kumar | |
| 2009/0146947 | A1 | 6/2009 | Ng | |
| 2012/0316661 | A1* | 12/2012 | Rahman | G06F 1/1694 |
| | | | | 700/94 |
| 2012/0317024 | A1* | 12/2012 | Rahman | G06Q 30/02 |
| | | | | 705/42 |
| 2014/0010417 | A1 | 1/2014 | Hwang | |
| 2014/0267024 | A1* | 9/2014 | Keller | G06F 3/017 |
| | | | | 345/156 |
| 2014/0273849 | A1* | 9/2014 | Lee | G06F 3/017 |
| | | | | 455/41.2 |
| 2015/0028996 | A1* | 1/2015 | Agrafioti | G06F 21/40 |
| | | | | 340/5.82 |
| 2015/0031348 | A1* | 1/2015 | Lee | H04B 1/385 |
| | | | | 455/418 |
| 2015/0057770 | A1* | 2/2015 | Bailey | A61B 5/6829 |
| | | | | 700/83 |
| 2015/0062086 | A1* | 3/2015 | Nattukallingal | G06F 3/016 |
| | | | | 345/175 |
| 2015/0067824 | A1* | 3/2015 | Chatterton | G06F 3/0486 |
| | | | | 726/19 |
| 2015/0120553 | A1* | 4/2015 | Li | H04M 1/72522 |
| | | | | 705/44 |
| 2015/0149924 | A1* | 5/2015 | Tsai | G06F 3/017 |
| | | | | 715/748 |
| 2015/0153831 | A1* | 6/2015 | Kim | G02B 27/017 |
| | | | | 345/156 |
| 2015/0164430 | A1* | 6/2015 | Hu | A61B 5/7264 |
| | | | | 600/595 |
| 2015/0269936 | A1* | 9/2015 | Alameh | G10L 15/26 |
| | | | | 704/235 |
| 2015/0286813 | A1* | 10/2015 | Jakobsson | G06F 21/35 |
| | | | | 726/9 |
| 2015/0288687 | A1* | 10/2015 | Heshmati | H04L 63/0861 |
| | | | | 726/7 |
| 2017/0038847 | A1* | 2/2017 | Schorsch | G06F 3/017 |

FOREIGN PATENT DOCUMENTS

| | | |
|---|---|---|
| CN | 103532982 A | 1/2014 |
| CN | 103607711 A | 2/2014 |
| CN | 103745142 A | 4/2014 |
| CN | 103996256 A | 8/2014 |
| CN | 104023128 A | 9/2014 |
| CN | 104050402 A | 9/2014 |
| CN | 104283876 A | 1/2015 |
| EP | 2720133 A2 | 4/2014 |
| JP | 2000508153 A | 6/2000 |
| JP | 2007174633 A | 7/2007 |
| JP | 2011-138279 A | 7/2011 |
| JP | 2014052942 A | 3/2014 |
| JP | 6186087 B | 8/2017 |
| RU | 2342806 C2 | 12/2008 |
| RU | 2445689 C2 | 3/2012 |
| WO | 2014143997 A1 | 9/2014 |
| WO | 2014153528 A2 | 9/2014 |

OTHER PUBLICATIONS

International Search Report (including English translation) issued in corresponding International Application No. PCT/CN2015/074517, dated Jul. 7, 2015, 6 pages.

Extended European Search Report issued in corresponding EP Application No. 15182439, dated Feb. 11, 2016, 6 pages.

Office Action (including English translation) issued in corresponding Japanese Patent Application No. 2016-550936, dated Nov. 22, 2016, 9 pages.

Office Action (including English analysis) issued in corresponding Russian Patent Application No. 2015125994/08 (040376), dated Dec. 13, 2016, 17 pages.

Office Action (including English translation) issued in corresponding Chinese Patent Application No. 201410515402.5, dated Feb. 4, 2017, 28 pages.

Second Office Action (including English translation) issued in corresponding Chinese Patent Application No. 201410515402.5, dated Sep. 19, 2017, 28 pages.

Office Action for Mexican patent application No. MX/a/2015/007310 dated Oct. 24, 2017, 6 pages.

English translation of Office Action for Mexican patent application No. MX/a/2015/007310 dated Oct. 24, 2017, 6 pages, 6 pages.

\* cited by examiner

METHODS AND DEVICES FOR AUTHORIZING OPERATION

CROSS-REFERENCE TO RELATED APPLICATIONS

The present application is a Continuation Application of International Application PCT/CN2015/074517, with an international filing date of Mar. 18, 2015, which is based upon and claims priority to Chinese Patent Application No. 201410515402.5, filed on Sep. 29, 2014, the entire contents of which are incorporated herein by reference.

TECHNICAL FIELD

The present disclosure generally relates to the field of network security, and more particularly, to methods and devices for authorizing an operation.

BACKGROUND

The mobile internet, which refers to accessing network based services via mobile devices such as a mobile phone, may provide a wide variety of services. The services may be related to a user's property and privacy.

Typically, to perform operations associated with network services via mobile devices, the user's identity is verified through a mobile phone verification code. The process may include the user sending a request for a predetermined operation to a server via the mobile phone. The server may cause the mobile phone to display a verification interface. Meanwhile, the server may send a six-bit dynamic authorization code to the binding mobile phone of the user. The user may input the six-bit dynamic authorization code received by the mobile phone into the verification interface displayed on the mobile phone, and submit the code to the server. The server, after it detect that the six-bit dynamic authorization code is correct, may authorize the mobile phone of the user to perform the predetermined operation.

SUMMARY

Methods and devices for authorizing an operation are provided by embodiments of the present disclosure. The technical solutions are as follows.

According to an aspect of embodiments of the present disclosure, there is provided a method for authorizing an operation, which is implemented in a mobile terminal. The method includes acquiring, by a mobile terminal, motion data collected by a wearable device. The method also includes comparing, by the mobile terminal, the motion data with a physical motion for verification. The method also includes in response to the motion data matching with the physical motion for verification, authorizing the mobile terminal to perform a predetermined operation corresponding to the physical motion for verification.

According to another aspect, there is provided a method for authorizing an operation, the method may be is implemented in a wearable device. The method may include collecting motion data. The method also includes sending the motion data to a mobile terminal, the mobile terminal being configured to determine whether the motion data matches with a physical motion for verification; and in response to the motion data being matched with the physical motion for verification, authorizing the mobile terminal to perform a predetermined operation corresponding to the physical motion for verification.

According to another general aspect a device for authorizing an operation is provided. the device may be a mobile terminal. The mobile terminal may include a processor. The mobile terminal also includes a memory for storing instructions executable by the processor. The processor may acquire motion data collected by a wearable device. The processor may compare the motion data with a physical motion for verification. The processor may, in response to the motion data being matched with the physical motion for verification, authorize the mobile terminal to perform a predetermined operation corresponding to the physical motion for verification.

According to yet another aspect a wearable device for authorizing an operation is described. The wearable device may include a processor. The wearable device also includes a memory for storing instructions executable by the processor. The processor may collect motion data. The processor may provide the motion data to a mobile terminal, the mobile terminal being configured to compare the motion data with a physical motion for verification, and in response to the motion data being matched with the physical motion for verification, the processor may authorize a predetermined operation corresponding to the physical motion for verification.

According to another aspect a wearable device for authorizing an operation to be performed on a mobile terminal is described. The wearable device may include a sensor to collect motion data. The wearable device may also include a transmitter to transmit the motion data for receipt by a mobile terminal. The mobile terminal may compare the motion data with a physical motion for verification, and in response to the motion data being a match with the physical motion for verification, authorize the mobile terminal to perform a predetermined operation corresponding to the physical motion for verification.

Motion data collected by a wearable device may be received by a mobile terminal. The motion data may be compared with a physical motion for verification. The physical motion for verification may be predetermined or dynamically generated. If the motion data matches with the physical motion for verification, the mobile terminal is authorized to perform a predetermined operation corresponding to the physical motion for verification. The mobile terminal may store a mapping between the physical motion for verification and the predetermined operation.

It is to be understood that both the foregoing general description and the following detailed description are exemplary and explanatory only and are non-limiting.

BRIEF DESCRIPTION OF THE DRAWINGS

The examples described throughout the present document may be better understood with reference to the following drawings and description. The components in the figures are not necessarily to scale. Moreover, in the figures, like-referenced numerals designate corresponding parts throughout the different views.

DETAILED DESCRIPTION

Figure 1:
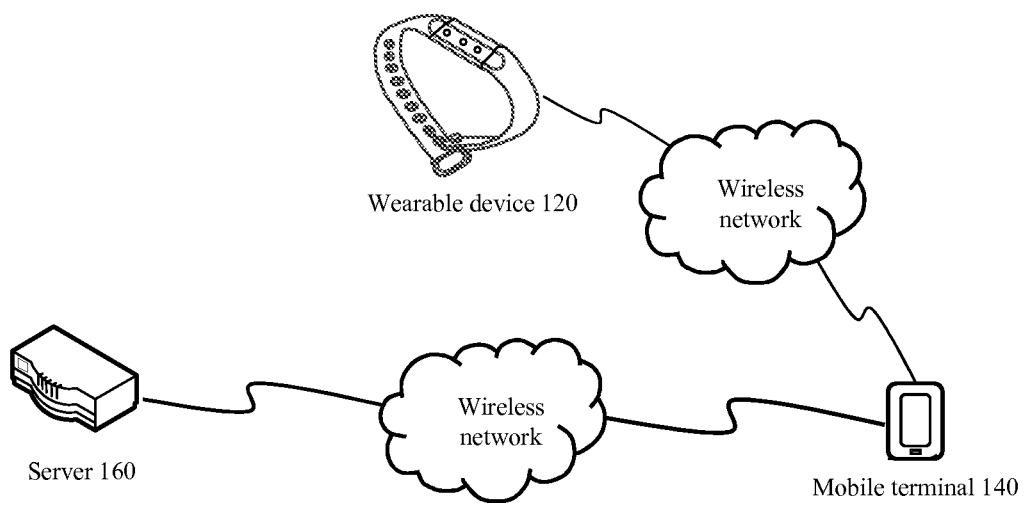
FIG. 1 is a schematic diagram of an example system for authorizing an operation.

FIG. 1 is a schematic diagram of an example system for authorizing an operation. The system may include a wearable device 120, a mobile terminal 140, and a server 160.

The wearable device 120 may communicate with the mobile terminal 140 through a wireless communication connection. The wireless connection may be a Bluetooth connection or a WiFi (Wireless-Fidelity) connection, or any other type of wireless communication network.

The wearable device 120 may be an electronic device, which is capable of acquiring motion data, and sending the motion data to the mobile terminal 140. For example, the wearable device 120 may be a smart wristband, a smart watch, a smart bracelet, a smart necklace, a smart ring, a smart glass, or any other type of mobile electronic wearable device. The wearable device 120 may include a sensor that acquires motion data, such as a gravity acceleration sensor, a gyroscope sensor, or any other type of motion sensor or a combination thereof.

The mobile terminal 140 may communicate with the server 160 through a wireless connection. The mobile terminal 140 may be an electronic device such as a smart mobile phone, a tablet computer, an electronic reader, a notebook computer or the like.

The server 160 may be a server, a server cluster that includes a plurality of servers, a cloud computing server center, or any other type of server or a combination thereof.

The motion data involved in the examples described throughout the present document includes data corresponding to a physical motion collected by the wearable device. The physical motion may be a pattern of movements or interactions performed with the wearable device 120. The physical motion may include hits, shakes, drawing, or other types of physical interaction with the wearable device 120. A hit may be a tap or click on the wearable device 120. For example, the motion data may be a single hit on the wearable device, a double hit on the wearable device, a single shake of the wearable device, a double shake of the wearable device, a drawing on the wearable device, or any other interaction. In an example, the wearable device 120 may capture motion data corresponding to a drawing of a triangle with the wearable device, drawing a rectangle with the wearable device, drawing other polygons with the wearable device, or the like.

The predetermined operation referred to in the examples throughout the present document may be an operation performed on the mobile terminal. The predetermined operation may use the user's network property and/or privacy. The predetermined operation may be divided into two types: a predetermined operation that is to be performed independently in the mobile terminal, and a predetermined operation that is to be performed interactively with a server.

For example, the predetermined operation performed independently in the mobile terminal may include an operation for checking a private short massage on the mobile terminal, an operation for checking call records on the mobile terminal, an operation for checking a geographical location of the mobile terminal, launching an encrypted application program of the mobile terminal, modifying a system setting on the mobile terminal, or the like.

The predetermined operation performed interactively with a server may include a payment operation performed interactively with the server, an account-transferring operation performed interactively with the server, a verification operation performed interactively with the server, a register operation performed interactively with the server, an operation for checking cloud information performed interactively with the server, or the like.

Figure 2:
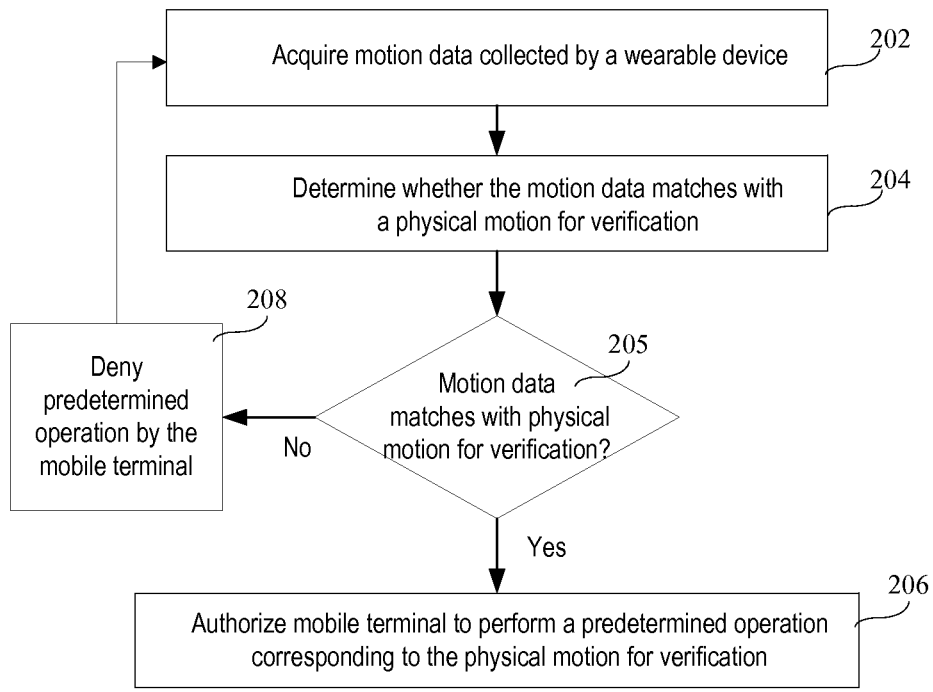
FIG. 2 is a flow chart of an example method for authorizing an operation.

FIG. 2 is a flow chart of an example method for authorizing an operation. The method for authorizing an operation, for example, may be implemented by the mobile terminal 140. The method for authorizing an operation may include at least the following steps.

In step 202, the mobile terminal 140 may acquire motion data collected by the wearable device 120.

In step 204, the mobile terminal 140 may determine if the motion data matches with a predetermined physical motion for verification.

In steps 205 and 206, if the motion data matches with the predetermined physical motion for verification, the mobile terminal 140 may be authorized to perform a predetermined operation corresponding to the physical motion for verification. In step 205 and 208, if the motion data fails to match with the predetermined physical motion for verification, the mobile terminal 140 may be denied authorization to perform the predetermined operation.

Thus, in the method for authorizing an operation, motion data collected by a wearable device may be acquired by the mobile terminal 140. The mobile terminal 140 may determine whether the motion data matches with the predetermined physical motion for verification, and if the motion data is matches with the predetermined physical motion for verification, the mobile terminal is authorized to perform a predetermined operation corresponding to the predetermined physical motion for verification. Accordingly, the technical problem of receiving a dynamic authorization code in a form of a short message and further complex steps of operation, which could result in a possible leakage of information, is solved by the above method. The described example provides a simplified authorization process to perform a predetermined operation that may be completed using the wearable device 120. Thus, user's property and privacy may be effectively protected, and the user security of the mobile internet may be improved. The user's property may include the user's credit card information, identity information, passwords, usernames, data such as documents, multimedia, or any other type of tangible or intangible property.

Figure 3:
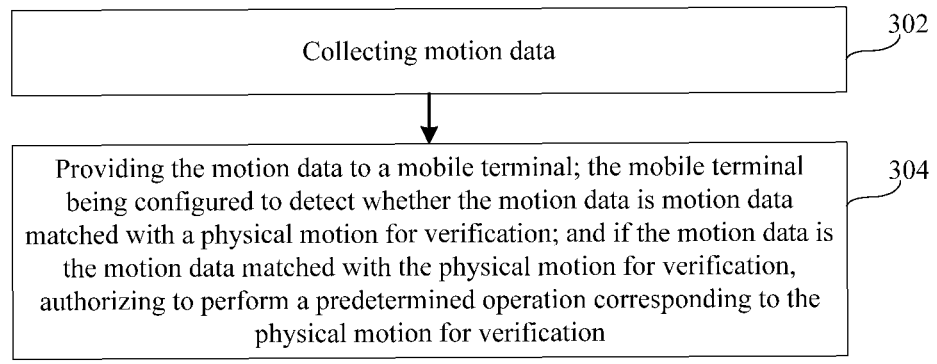
FIG. 3 is a flow chart of an example method for authorizing an operation.

FIG. 3 is a flow chart of an example method for authorizing an operation. The method for authorizing an operation as described may be implemented by the wearable device 120. As shown in FIG. 3, the method for authorizing an operation may include at least the following steps.

In step 302, the wearable device 120 may collect motion data.

In step 304, the wearable device 120 may send the motion data to the mobile terminal 140. The mobile terminal 140 may detect whether the motion data matches with a predetermined physical motion for verification. If the motion data matches with the physical motion for verification, the mobile terminal 140 is authorized to perform a predetermined operation corresponding to the predetermined physical motion for verification.

Thus, in the method for authorizing an operation provided by the present embodiment, the wearable device 120 may collect motion data and send the motion data to the mobile terminal 140. The mobile terminal may be configured to detect whether the motion data matches a predetermined physical motion for verification. If the motion data matches the predetermined physical motion for verification, the mobile terminal 140 is authorized to perform a predetermined operation corresponding to the predetermined physical motion for verification. Accordingly, the technical problem of providing the dynamic authorization code such as in a short message that requires a complex acquiring operation, and may be endangered because of a probable leak. The example method described provides a simplified authorization process to perform a predetermined operation that may be completed via the wearable device 120. Thus, user's property and privacy may be effectively protected, and the user security may be improved.

Figure 4A:
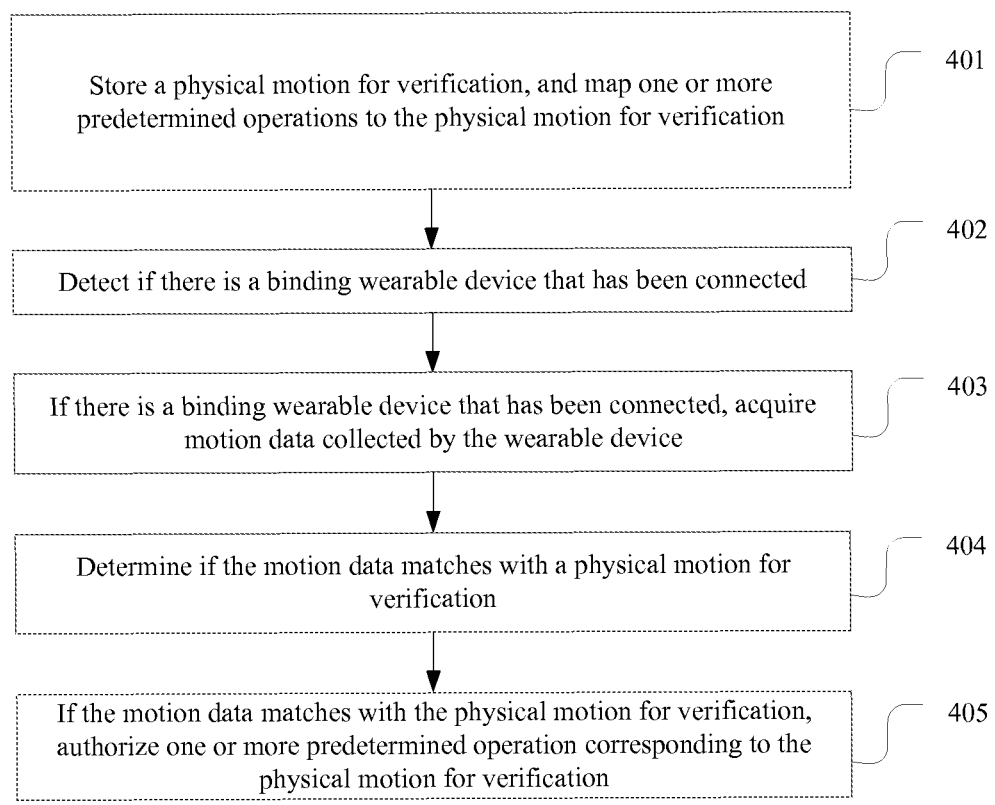
FIG. 4A is a flow chart of an example method for authorizing an operation.

FIG. 4A is a flow chart of an example method for authorizing an operation. The method for authorizing an operation may be implemented by the wearable device 120 and the mobile terminal 140. The example below is described using a predetermined operation of an operation for checking a private picture on the mobile terminal. However, any other predetermined operation may be authorized by the method as will be obvious to a person skilled in the art based on the description. The method for authorizing an operation may include at least the following steps.

In step 401, the mobile terminal may store in advance at least one physical motion for verification, and a predetermined operation corresponding to the at least one physical motion for verification. The physical motion for verification may correspond to a single predetermined operation or multiple predetermined operations.

For example, a single shake of the wearable device may be stored as a physical motion for verification, which corresponds to an operation for checking a private short message on the mobile terminal. In another example, a double shake of the wearable device may be stored as another physical motion for verification, which corresponds to an operation for checking call records on the mobile terminal. In another example, a triple shake of the wearable device may be stored as still another physical motion for verification, which corresponds to both, the operation for checking a private short message on the mobile terminal and the operation for checking call records on the mobile terminal.

In step 402, the mobile terminal 140 may detect whether there is a binding wearable device 120 that is connected with the mobile terminal 140.

The mobile terminal 140 may establish a binding relationship with the wearable device 120. For example, the mobile terminal 140 may only establishes a connection with a binding wearable device, rather than establishing a connection with an unbinding wearable device.

The predetermined operation in our example is an operation for checking a private picture on the mobile terminal 140. After the user initiates an operation for checking a private picture on the mobile terminal 140, the mobile terminal 140 detects whether currently there is a binding wearable device such as the wearable device 120 that is communicatively connected with the mobile terminal 140.

In step 403, upon detection that the wearable device 120 is a connected binding wearable device, the mobile terminal 140 may acquire motion data collected by the wearable device 120.

In an example, the step 403 may include but is not limited to the following sub-steps.

If a preset physical motion for verification exists, the mobile terminal 140 may directly acquire the motion data collected by the wearable device 120.

Figure 4B:
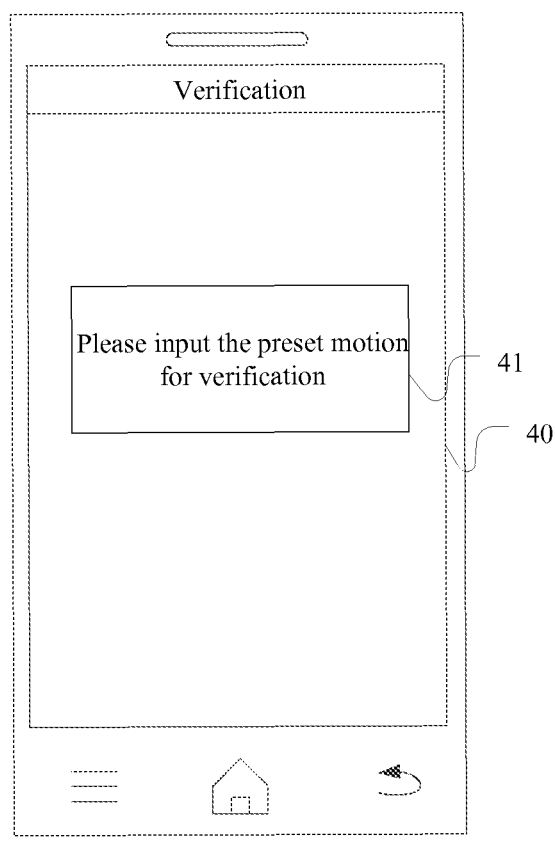
FIG. 4B is a schematic diagram of an example interface for authorizing an operation.

For example, the user may preset a physical motion for verification corresponding to the predetermined operation in the mobile terminal 140. In an example, the physical motion for verification may be a triple hit on the wearable device 120. A dialog box 41 as shown in FIG. 4B may appear on the interface 40 of the mobile terminal 140. The dialog box 41 may prompt the user to input the physical motion for verification. The user may directly hit the wearable device 120 for three times. The wearable device 120 may send the collected motion data of the triple hit on the wearable device 120 to the mobile terminal 140. The mobile terminal 140 may receive the motion data collected by the wearable device 120. In an example, "directly acquiring" means that the mobile terminal 140 may not prompt the user about the specific motion of the physical motion for verification that needs to be performed by the user.

It should be noted that, different predetermined operations may correspond to different physical motions for verification. The physical motion for verification corresponding to each predetermined operation may be set by default in the mobile terminal 140 or set manually by the user.

In another example, the step 403 may include but is not limited to the following sub-steps.

If a preset physical motion for verification does not exist, the mobile terminal 140 may dynamically generate a physical motion for verification. The mobile terminal 140 may select the physical motion for verification from a library of possible physical motions based on the wearable device 120. The library of possible physical motions may be predetermined and stored on the mobile terminal 140. Alternatively or in addition, the mobile terminal 140 may detect the wearable device 120 and identify the possible physical motions that may be performed using the wearable device 120.

The mobile terminal may randomly select a physical motion for verification. from the preset physical motion library.

Consider that, the dynamically generated physical motion for verification is, for example, a single shake of the wearable device. Other selections are possible.

The mobile terminal may prompt the user about the physical motion for verification.

Figure 4C:
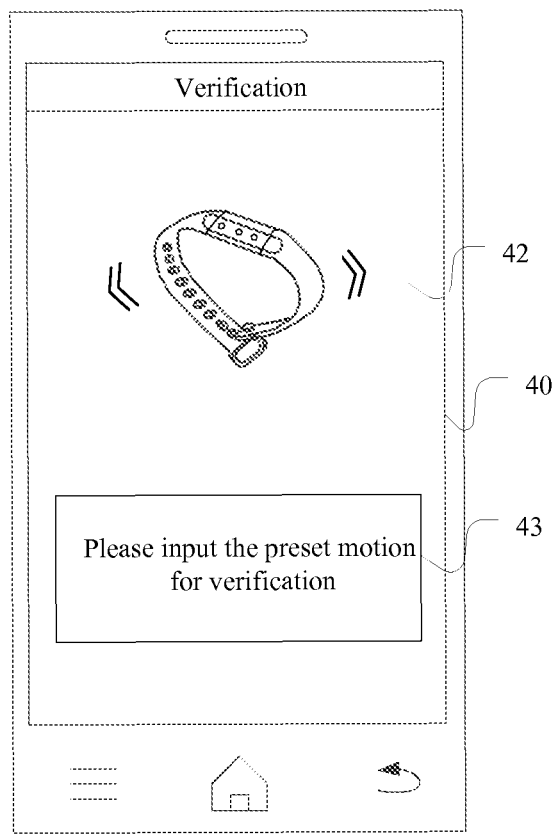
FIG. 4C is a schematic diagram of an example interface for authorizing an operation.

For example, referring to FIG. 4C, an area 42 for the prompting about the dynamically generated physical motion for verification is displayed on the interface 40 of the mobile terminal 140. In the area 42, the user may be prompted that the dynamically generated physical motion for verification is a single shake of the wearable device 120. A dialog box 43 may be displayed on the interface 40 of the mobile terminal 140, which prompts the user to input the dynamically generated physical motion for verification.

After the prompting about the physical motion for verification, the mobile terminal 140 may acquire the motion data collected by the wearable device 120.

After being prompted about the physical motion for verification, the user may shake the wearable device 120 once according to the dynamically generated physical motion for verification prompted by the mobile terminal 140. The wearable device 120 may send the collected motion data of the single shake of the wearable device 120 to the mobile terminal 140. The mobile terminal 140 may acquire the motion data collected by the wearable device 120.

When a predetermined operation is to be performed, the mobile terminal 140 may determine whether a preset physical motion for verification corresponding to the predetermined operation exists. If it does exist, the mobile terminal 140 may use the preset physical motion for verification to perform the step 403; and if the preset physical motion for verification does not exist, the mobile terminal 140 may dynamically generate the physical motion for verification to perform the step 403.

In an example, if there is no binding wearable device that has been connected, the mobile terminal 140 may first establish a connection with the wearable device 120 to make it a binding wearable device, and then perform the above step 403.

In step 404, the mobile terminal 140 may detect whether the motion data matches with the physical motion for verification.

Upon acquiring the motion data collected by the wearable device 120, the mobile terminal may detect whether the motion data matches with the physical motion for verification.

In step 405, if the motion data matches with the physical motion for verification, the mobile terminal 140 is authorized to perform the predetermined operation corresponding to the physical motion for verification.

In the present example consider that the motion data matches with the physical motion for verification. Since, the predetermined operation is the operation for checking a private picture in the mobile terminal, which is an operation that may be performed independently by the mobile terminal, the mobile terminal authorizes the predetermined operation corresponding to the physical motion for verification. That is, the mobile terminal permits the user to check the private picture in the mobile terminal.

Thus, in the method for authorizing an operation described in this example, motion data collected by a wearable device may be acquired by the mobile terminal 140. The mobile terminal detects whether the motion data matches with a physical motion for verification. If the motion data matches with the physical motion for verification, the mobile terminal 140 is authorized to perform the predetermined operation corresponding to the physical motion for verification. Accordingly, the technical problem of acquiring a dynamic authorization code in a form of a short message that involves a complex acquiring operation, and may probably be leaked, is solved by the examples described in the present document. The examples provide a simplified authorization process to perform a predetermined operation that may be completed via the wearable device 120. Thus, user's property and privacy may be effectively protected, and the user security of the mobile internet may be improved.

Prior to the wearable device 120 being connected to the mobile terminal 140, a binding relationship may be established in advance with the wearable device 120.

The binding relationship between the wearable device 120 and the mobile terminal 140 may be established in various ways.

Figure 4D:
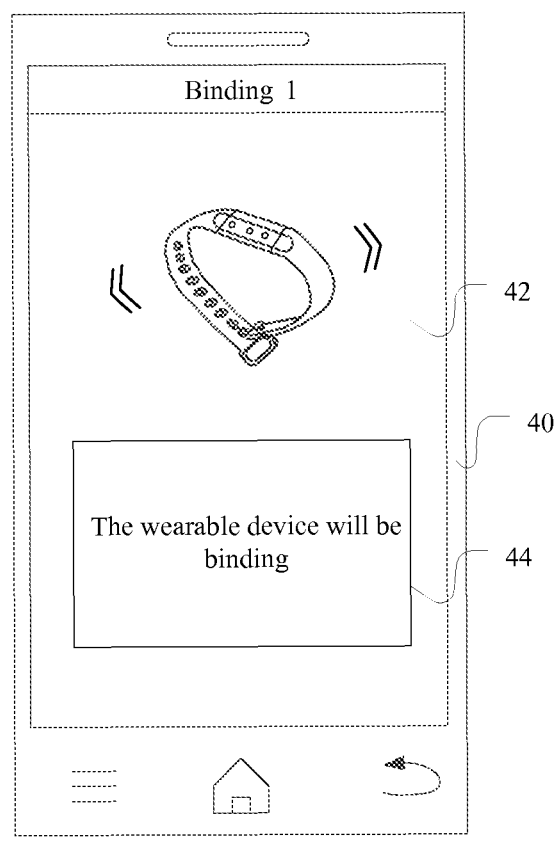
FIG. 4D is a schematic diagram of an example interface for authorizing an operation.

For example, referring to FIG. 4D, the mobile terminal 140 may preset a physical motion for binding. The mobile terminal 140 may display the physical motion for binding in the area 42 on the interface 40 of the mobile terminal 140. The user may operate the wearable device 120 according to the physical motion for binding. The wearable device 120 may collect the motion data generated by the user, and send the motion data to the mobile terminal 140. The mobile terminal 140 may receive the motion data collected by the wearable device 120. The mobile terminal 140 may determine whether the motion data matches with the preset physical motion for binding. If the motion data matches with the physical motion for binding, the mobile terminal 140 may establish the binding relationship with the wearable device 120, and prompt the user through a prompt box 44 that the wearable device 120 is bound on the interface 40 of the mobile terminal 140.

Figure 4E:
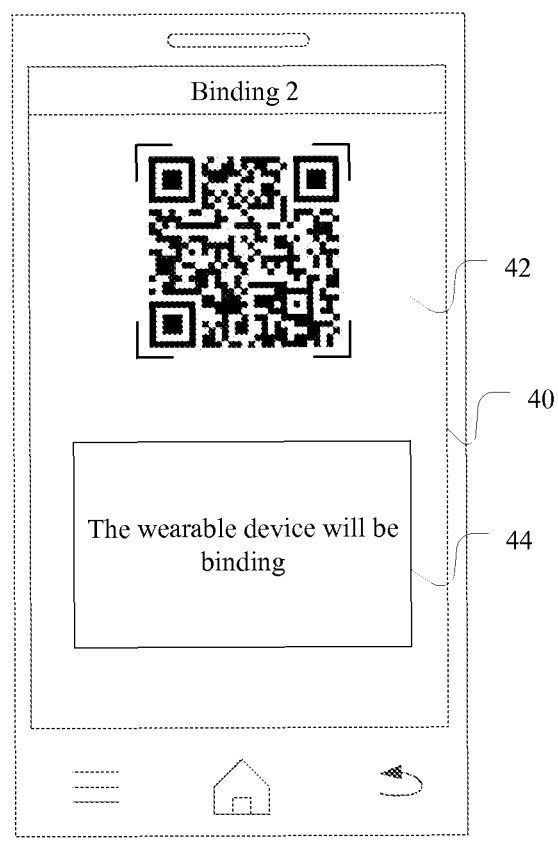
FIG. 4E is a schematic diagram of an example interface for authorizing an operation.

In another example, referring to FIG. 4E, a two-dimensional identification code may be preset on a housing or a package of the wearable device 120. The two-dimensional identification code may correspond to an identification of the wearable device 120. The mobile terminal 140 may scan the two-dimensional identification code of the wearable device 120, and display the identification of the wearable device in the area 42 on the interface 40 of the mobile terminal 140. The mobile terminal 140 may send the identification of the wearable device 120 and a device identification of the mobile terminal 140 to the server 160, which may establish the binding relationship between the wearable device 120 and the mobile terminal 140 based on the identification of the wearable device 120 and the device identification of the mobile terminal 140. The user may be prompted that the wearable device 120 is binding in a prompt box 44 on the interface 40 of the mobile terminal 140.

Figure 4F:
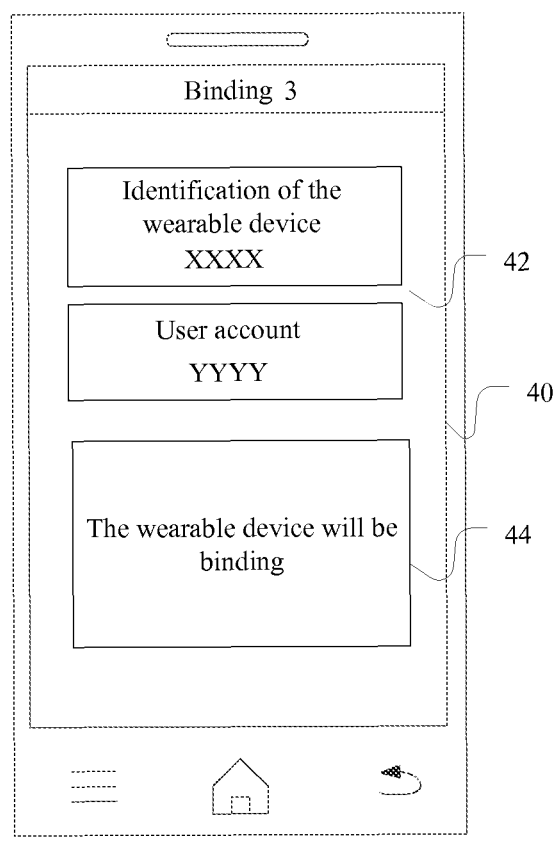
FIG. 4F is a schematic diagram of an example interface for authorizing an operation.

In yet another example, referring to FIG. 4F, the user may be prompted to input the identification of the wearable device 120 and a user account in the area 42 on the interface 40 of the mobile terminal 140. The mobile terminal 140 may send the identification of the wearable device 120 and the user account to the 1600, which may bind the wearable device 120 and the user account according to the identification of the wearable device 120, and establish the binding relationship between the wearable device 120 and the mobile terminal 140 using the user account. Eventually, the user may be prompted that the wearable device is binding in a prompt box 44 on the interface 40 of the mobile terminal 140.

Figure 5:
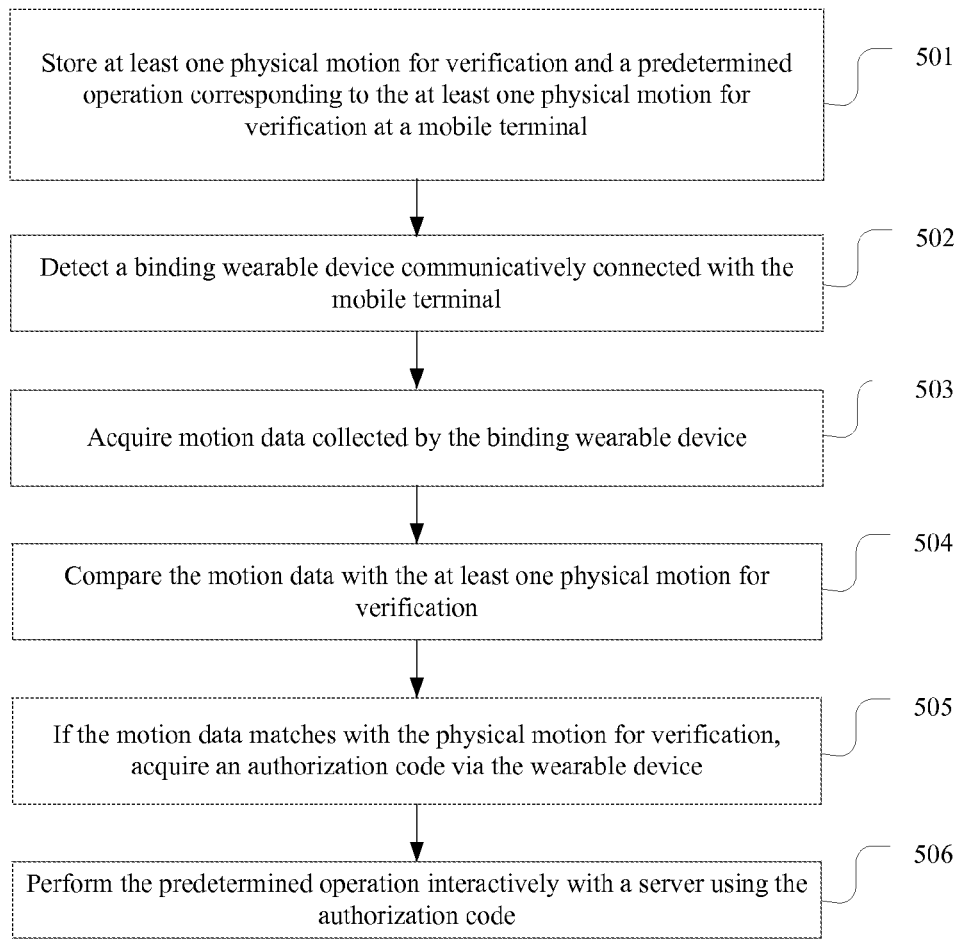
FIG. 5 is a flow chart of an example method for authorizing an operation.

FIG. 5 is a flow chart of an example method for authorizing an operation. The method for authorizing an operation described may be implemented by the wearable device 120 and the mobile terminal 140. Consider that the predetermined operation is, for example, a payment operation which is performed interactively with the server 160. Other examples of predetermined operations are possible. The method for authorizing an operation may include at least the following steps.

In step 501, the mobile terminal may store a physical motion for verification, and a predetermined operation corresponding to, or mapped with the physical motion for verification. In an example, the physical motion for verification may be associated with a single predetermined operation. Alternatively or in addition, the physical motion for verification may be associated with multiple predetermined operations. A predetermined operation may also be associated with multiple physical motions for verification.

For example, a single shake of the wearable device 120 may be stored as a physical motion for verification, which corresponds to an operation for checking a private short message on the mobile terminal 140. In another example, a double shake of the wearable device 120 may be stored as a physical motion for verification, which corresponds to an operation for checking call records on the mobile terminal 140. In another example, a triple shake of the wearable device 120 may be stored as still another physical motion for verification, which corresponds to both of the operation for checking a private short message on the mobile terminal 140 and the operation for checking call records on the mobile terminal 140.

In step 502, the mobile terminal 140 may detect whether there is a binding wearable device that has been connected.

The mobile terminal 140 may establish in advance a binding relationship with the wearable device 120. Generally, the mobile terminal 140 only establishes a connection with the binding wearable device, rather than establishing a connection with the unbinding wearable device.

For example, consider the case where the predetermined operation is a payment operation that is performed interactively with the server 160. After the user initiates the payment operation to be performed interactively with the server 160, the mobile terminal 140 may detect whether there is a binding wearable device that is currently connected.

In step 503, if there the wearable device 120 is identified as a binding wearable device that is connected, the mobile terminal 140 may receive motion data collected by the wearable device 120.

In an example the step 503 may include but is not limited to the following sub-steps.

If a preset physical motion for verification exists, the mobile terminal 140 may directly acquire the motion data collected by the wearable device 120.

For example, the user may preset a physical motion for verification corresponding to the predetermined operation in the mobile terminal 140. For example, the physical motion for verification may be a triple hit on the wearable device. The interface of the mobile terminal may prompt the user to input the physical motion for verification. The user may hit the wearable device 120 for three times, upon which, the wearable device 120 may send the collected motion data of the triple hit to the mobile terminal 140. The mobile terminal 140 may acquire the motion data collected by the wearable device 120. The, "directly acquiring" the motion data from the wearable device 120 means that the mobile terminal 140 may not prompt the user about the physical motion for verification to be performed by the user for the predetermined operation.

Different predetermined operations may correspond to different physical motions for verification. The physical motion for verification corresponding to each predetermined operation may be set in default by the mobile terminal or set manually by the user.

In another example, the step 503 may include but is not limited to the following sub-steps.

If a preset physical motion for verification does not exist, the mobile terminal 140 may dynamically generate a physical motion for verification.

For example, if the user or the mobile terminal 140 has not preset a physical motion for verification corresponding to the predetermined operation, the mobile terminal 140 may dynamically select or generate the physical motion for verification. For example, a physical motion may be selected from a preset physical motion library.

Consider that the mobile terminal 140 dynamically selected a single shake of the wearable device 120 as the physical motion for verification.

The mobile terminal 140 may prompt the user about the selected physical motion for verification.

A prompting message may be displayed on the interface of the mobile terminal 140 prompting the user about that the physical motion for verification is a single shake of the wearable device 120, and prompting the user to input the physical motion for verification.

After the prompting about the physical motion for verification, the mobile terminal 140 may acquire the motion data collected by the wearable device 120.

Upon being prompted about the physical motion for verification, the user may shake the wearable device 120 once according to the selected physical motion for verification. The wearable device 120 may send the collected motion data of the single shake of the wearable device 120 to the mobile terminal 140. The mobile terminal 140 may acquire the motion data collected by the wearable device 120.

When a certain predetermined operation is to be performed, the mobile terminal 140 may detect whether a preset physical motion for verification corresponding to the predetermined operation exists. If it does exist, the step 503 may be performed using the preset physical motion for verification. If a physical motion for verification is not preset, the step 503 may be performed based on the dynamically selected physical motion for verification.

If there is no binding wearable device that has been connected, the mobile terminal 140 may first establish a connection with the wearable device 120, and then perform the above step 503.

In step 504, the mobile terminal 140 may detect whether the motion data matches with the physical motion for verification.

In step 505, if the motion data is matches with the physical motion for verification, a code may be acquired through the wearable device 120.

Since the motion data matches with the physical motion for verification, and the predetermined operation is the payment operation which is performed interactively with the payment server, the mobile terminal 140 may acquire an authorization code through the wearable device 120.

In an example, the step 505 may include but is not limited to the following sub-steps.

The mobile terminal may acquire an encrypted authorization code from the server 160.

The server 160 may generate the encrypted authorization code according to an encryption key, and the mobile terminal 140 may acquire the encrypted authorization code from the server 160.

2. The mobile terminal 140 may send the encrypted authorization code to the wearable device 120.

The mobile terminal 140 may send the encrypted authorization code to the wearable device 120. The wearable device 120 may acquire a decrypted authorization code according to a decryption key, and sends the decrypted authorization code to the mobile terminal 140.

3. The mobile terminal 140 may acquire the authorization code decrypted by the wearable device 120.

In another example, the step 505 may include but is not limited to the following sub-steps.

1. The mobile terminal 140 may acquire an authorization code generated by the wearable device 120.

If the motion data matches with the physical motion for verification, the mobile terminal 140 may send an indication for a successful verification to the wearable device 120. Upon receiving the indication for a successful verification, the wearable device 120 may generate an authorization code through a predetermined program, and then send the authorization code to the mobile terminal 140.

Thus, the step 505 may acquire an authorization code either from the server 160, or from the wearable device 120 itself.

In step 506, the predetermined operation may be performed interactively with the server 160 by using the authorization code.

After it acquires the authorization code, the mobile terminal 140 may send the authorization code and the request for the payment operation to the server 160. The server 160 may determine whether the authorization code is correct. If the authorization code is correct, the payment operation is allowed to be performed, else if the authorization code is not correct, the payment operation is disallowed.

In the method for authorizing an operation described, motion data collected by the wearable device 120 may be acquired by the mobile terminal 140. The mobile terminal 140 may determine whether the motion data matches with a physical motion for verification. If the motion data matches with the physical motion for verification, the mobile terminal is authorized to perform the predetermined operation corresponding to the physical motion for verification. Accordingly, the technical problems related to receiving a dynamic authorization code in a form of a short message, which requires a complex acquiring operation, and may probably be leaked, are solved. A simplified authorization process is provided, to perform a predetermined operation that may be completed using the wearable device 120. Thus, user's property and privacy may be effectively protected, and the user security of the mobile internet may be improved.

Also, in the method for authorizing an operation, an authorization code may be acquired through the wearable device 120. Thus, the chances that the authorization code is leaked are minimized. Since the wearable device 120 participates in the process of acquiring the authorization code, the user security of the mobile internet may be improved.

Before the wearable device 120 is connected to the mobile terminal 140, a binding relationship may be established in advance between the wearable device 120 and the mobile terminal 140.

The binding relationship between the wearable device 120 and the mobile terminal 140 may be established in a manner described in examples throughout the present document.

In step 504, the physical motion corresponding to the predetermined operation may be preset by the user. In other words, prior to step 504, the mobile terminal 140 may perform at least the following steps.

The mobile terminal 140 may receive a setting instruction from the user. The setting instruction may set a physical motion for verification corresponding to a predetermined operation.

For example, the mobile terminal may displays a number of, for example 10, candidate physical motions for verification. The user may select one of the candidate physical motions for verification as the physical motion for verification corresponding to the predetermined operation.

The mobile terminal 140 may store a mapping, or a corresponding relationship between the predetermined operation and the selected physical motion for verification.

Different predetermined operations may correspond to different physical motions for verification. One predetermined operation may correspond to a plurality of physical motions for verification. One physical motion for verification may also correspond to a plurality of predetermined operations.

The mobile terminal 140 may release the binding with the binding wearable device. There may be various ways for releasing the binding.

For example, the wearable device 120 may acquire another motion data, and sends said another motion data to the mobile terminal 140 which is configured to detect whether said another motion data is matched with a physical motion for releasing a binding. If the another motion data matches with the physical motion for releasing a binding, the binding relationship between the mobile terminal 140 and the wearable device 120 may be released. The physical motion for releasing a binding may be set after the physical motion for binding is set. In an example, once the physical motion for releasing a binding is successfully set, it may not be modified.

For example, the binding relationship may be terminated based on a two-dimensional identification code. The two-dimensional identification code may be preset on a housing or a package of the wearable device 120. The two-dimensional identification code may be an identification of the wearable device 120 such as a serial number. The mobile terminal 140 may scan the two-dimensional identification code of the wearable device 120, and obtain the identification of the wearable device 120. The mobile terminal 140 may send a request for releasing a binding to the server 160 which carries the identification of the wearable device 120 and a device identification of the mobile terminal 140. The server 160 may release the binding relationship between the wearable device 120 and the mobile terminal 140 based on the identification of the wearable device 120 and the device identification of the mobile terminal 140.

In another example, the user may input the identification of the wearable device 120 and a user account on the interface of the mobile terminal 140. The mobile terminal 140 may send a request for releasing a binding to the server 160 which carries the identification of the wearable device 120 and the user account. The server may release the binding between the wearable device 120 and the user account according to the identification of the wearable device 120. Thus, the binding relationship between the wearable device 120 and the mobile terminal 140 using the user account may be released.

Figure 6:
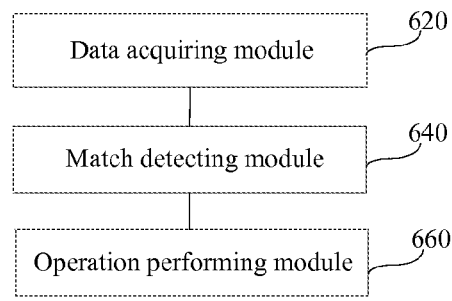
FIG. 6 is a block diagram of an example device for authorizing an operation.

FIG. 6 is a block diagram of an example device for authorizing an operation. The device may be a part of the mobile terminal 140 in a form of combination of hardware and software. Alternatively, the device may be the mobile terminal 140. The device may include, among other components, a data acquiring module 620, a match detecting module 640, and an operation performing module 660.

The data acquiring module 620 may acquire motion data collected by a wearable device 120.

The match detecting module 640 may determine whether the motion data matches a physical motion for verification.

The operation performing module 660 may authorize the mobile terminal 140 to perform a predetermined operation corresponding to the physical motion for verification if the motion data matches with the physical motion for verification.

In the device for authorizing an operation motion data collected by the wearable device 120 may be acquired. Whether the motion data matches with the physical motion for verification is determined, and if the motion data matches with the physical motion for verification, the mobile terminal 140 may be authorized to perform a predetermined operation corresponding to the physical motion for verification. Accordingly, the technical problems related to receiving a dynamic authorization code in a form of a short message, which requires a complex acquiring operation, and may probably be leaked, are solved. A simplified authorization process is provided, to perform a predetermined operation that may be completed using the wearable device 120. Thus, user's property and privacy may be effectively protected, and the user security of the mobile internet may be improved.

Figure 7:
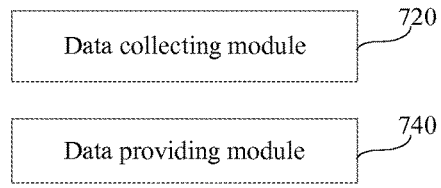
FIG. 7 is a block diagram of an example device for authorizing an operation.

FIG. 7 is a block diagram of an example device for authorizing an operation. The device may be a part or whole of the wearable device 120 in form hardware and software. The device may include, among other components, a data collecting module 720, and a data providing module 740.

The data collecting module 720 may collect motion data.

The data providing module 740 may provide the motion data to the mobile terminal 140. The mobile terminal 140 may detect whether the motion data is matched with a physical motion for verification. If the motion data is matched with the physical motion for verification, the mobile terminal 140 may be authorized to perform a predetermined operation corresponding to the physical motion for verification.

In the device for authorizing an operation, motion data may be collected, and sent to the mobile terminal 140. The mobile terminal 140 may determine whether the motion data matches with a physical motion for verification. If the motion data matches with the physical motion for verification, the mobile terminal 140 is authorized to perform a predetermined operation corresponding to the physical motion for verification. Accordingly, the technical problems related to receiving a dynamic authorization code in a form of a short message, which requires a complex acquiring operation, and may probably be leaked, are solved. A simplified authorization process is provided, to perform a predetermined operation that may be completed using the wearable device 120. Thus, user's property and privacy may be effectively protected, and the user security of the mobile internet may be improved.

Figure 8:
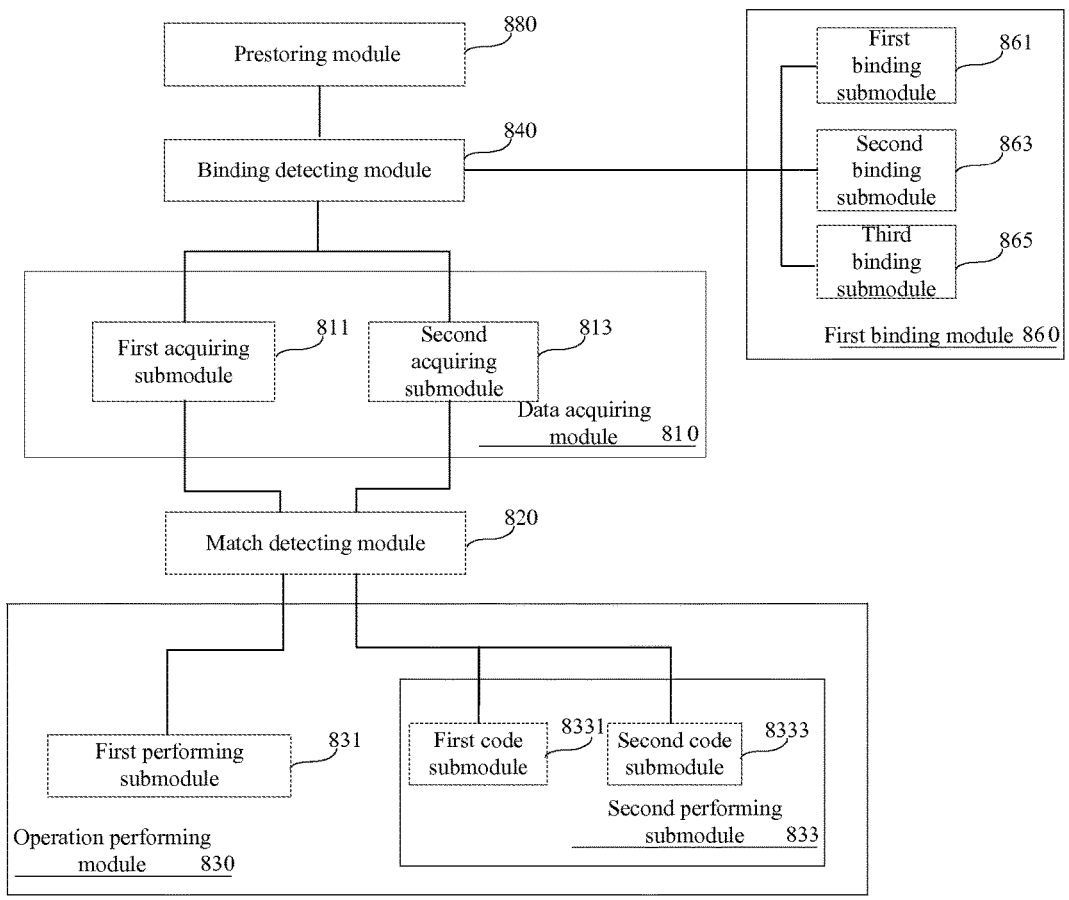
FIG. 8 is a block diagram of an example device for authorizing an operation.

FIG. 8 is a block diagram of an example device for authorizing an operation. The device may be a part or whole of the mobile terminal 140 in form of hardware, or a combination of hardware and software. The device may include, among other components, a data acquiring module 810, a match detecting module 820, and an operation performing module 830.

The data acquiring module 810 may acquire motion data collected by the wearable device 120.

The match detecting module 820 may detect whether the motion data is matched with a physical motion for verification.

The operation performing module 830 may authorize the mobile terminal 140 to perform a predetermined operation corresponding to the physical motion for verification, if the motion data is matched with the physical motion for verification.

The operation performing module 830 may include, among other components, a first performing submodule 831, and a second performing submodule 833.

The first performing submodule 831 may directly perform the predetermined operation if the predetermined operation is to be performed independently in the mobile terminal 140.

The second performing submodule 833 may acquire an authorization code through the wearable device 120 if the predetermined operation is a predetermined operation required to be performed interactively with the server 160. The second performing submodule 833 may perform the predetermined operation interactively with the server 160 by using the authorization code.

The second performing submodule 833 may include, among other components, a first code submodule 8331 and/or a second code submodule 8333.

The first code submodule 8331 may acquire an encrypted authorization code from the server 160. The first code submodule 8331 may send the encrypted authorization code to the wearable device 120. The first code submodule 8331 may acquire an authorization code decrypted by the wearable device 120.

The second code submodule 8333 may acquire an authorization code generated by the wearable device 120, from the wearable device 120 itself.

The data acquiring module 810 may include, among other components, a first acquiring submodule 811, and/or a second acquiring submodule 813.

The first acquiring submodule 811 may directly acquire motion data collected by the wearable device 120 if a preset physical motion for verification exists.

The second acquiring submodule 813 may dynamically generate a physical motion for verification. The second acquiring submodule 813 may prompt a user about the physical motion for verification. After the prompting about the physical motion for verification, the second acquiring submodule 813 may acquire the motion data collected by the wearable device 120.

In an example, the device may further include a binding detecting module 840.

The binding detecting module 840 may detect whether there is a binding wearable device that has been connected.

The data acquiring module 810 may perform the step of acquiring motion data collected by the wearable device 120 if the wearable device 120 is a binding wearable device that has been connected.

In another example, the device may include a first binding module 860.

The first binding module 860 may establish a binding relationship with the wearable device. The first binding module 860 may establish the binding relationship prior to the device receiving motion data from the wearable device 120.

The first binding module 860 may include, among other components, a first binding submodule 861, a second binding submodule 863, and a third binding submodule 865.

The first binding submodule 861 may acquire another motion data of the wearable device 120. The first binding submodule 861 may detect whether the another motion data matches a physical motion for binding. If the another motion data matches the physical motion for binding, the first binding submodule 861 may establish the binding relationship with the wearable device 120.

The second binding submodule 863 may scan a two-dimensional identification code of the wearable device 120 to obtain an identification of the wearable device 120. The second binding submodule 863 may send the identification of the wearable device 120 and a device identification of a mobile terminal 140 to the server 160. The server may establish the binding relationship between the wearable device 120 and the mobile terminal 140 based on the identification of the wearable device 120 and the device identification of the mobile terminal 140.

The third binding submodule 865 may send an identification of the wearable device 120 and a user account to the server 160. The server 160 may bind the wearable device 120 and the user account according to the identification of the wearable device 120. Thus, the third binding submodule 865 may establish the binding relationship between the wearable device 120 and the mobile terminal 140 using the user account.

The device may include, among other components, a prestoring module 880.

The prestoring module 880 may store a physical motion for verification with a mapping to a predetermined operation. The physical motion for verification may be mapped to a single predetermined operation. Alternatively or in addition, the physical motion for verification may be mapped to multiple predetermined operations. A predetermined operation may be mapped to a single physical motion for verification, or multiple physical motions for verification.

In the device for authorizing an operation, motion data is collected by the wearable device 120. The motion data is compared with a physical motion for verification, and if the motion data matches with the physical motion for verification, the mobile terminal 140 is authorized to perform a predetermined operation corresponding to the physical motion for verification. Accordingly, the technical problems related to receiving a dynamic authorization code in a form of a short message, which requires a complex acquiring operation, and may probably be leaked, are solved. A simplified authorization process is provided, to perform a predetermined operation that may be completed using the wearable device 120. Thus, user's property and privacy may be effectively protected, and the user security of the mobile internet may be improved.

In the device for authorizing an operation, an authorization code may be acquired through the wearable device 120. Thus the authorization code is not likely to be leaked. Moreover, since the wearable device 120 participates in the process of acquiring the authorization code, the user security of the mobile internet may be improved, since proximity of the wearable device 120 and the mobile terminal 140 is an additional factor towards the user security.

Figure 9:
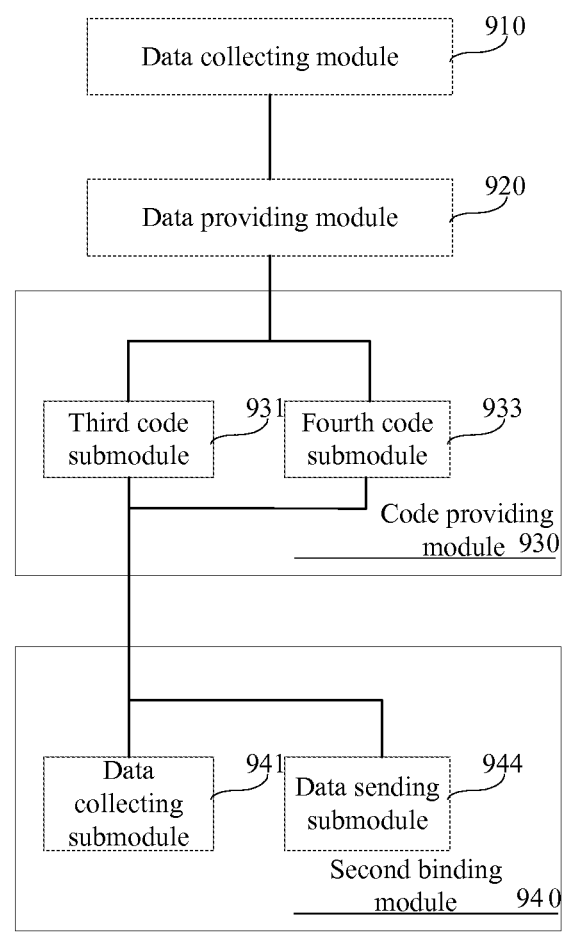
FIG. 9 is a block diagram of an example device for authorizing an operation.

FIG. 9 is a block diagram of an example device for authorizing an operation. The device for authorizing an operation may be a part or whole of the wearable device 120 in form of hardware or combination of hardware and software. The device may include, among other components, a data collecting module 910, and a data providing module 920.

The data collecting module 910 may collect motion data.

The data providing module 920 may provide the motion data to the mobile terminal 140. The mobile terminal 140 may detect whether the motion data is matched with a physical motion for verification. If the motion data is matched with the physical motion for verification, the mobile terminal 140 may be authorized to perform a predetermined operation corresponding to the physical motion for verification.

In an example, the device may include, a code providing module 930.

The code providing module 930 may provide an authorization code to the mobile terminal 140 if the motion data matches the physical motion for verification. The mobile terminal 140 may perform the predetermined operation interactively with the server 160 by using the authorization code.

In an example, the code providing module 930 may include, among other components, a third code submodule 931 and/or a fourth code submodule 933.

The third code submodule 931 may receive an encrypted authorization code acquired by the mobile terminal 140 from the server 160. The third code submodule 931 may decrypt the encrypted authorization code to obtain a decrypted authorization code. The third code submodule 931 may send the decrypted authorization code to the mobile terminal 140.

The fourth code submodule 933 may generate an authorization code, and send the authorization code to the mobile terminal 140.

In an example, the device may additionally include, a second binding module 940.

The second binding module 940 may establish a binding relationship with the mobile terminal 140. The second binding module 940 may establish the binding relationship with the mobile terminal 140 prior to collecting physical motion data to be sent to the mobile terminal 140.

The second binding module 940 may include, among other components, a data collecting submodule 941, and a data sending submodule 943.

The data collecting submodule 941 may collect another motion data.

The data sending submodule 943 may send the another motion data to the mobile terminal 140. The mobile terminal 140 may detect whether the another motion data matches a physical motion preset for binding. If said another motion data matches with the preset physical motion for binding, the binding relationship between the wearable device 120 and the mobile terminal 140 may be established.

In the device for authorizing an operation, motion data is collected by the wearable device 120. Based on whether the motion data matches with the physical motion for verification the mobile terminal 140 may be authorized to perform a predetermined operation corresponding to the physical motion for verification. Accordingly, the technical problems related to receiving a dynamic authorization code in a form of a short message, which requires a complex acquiring operation, and may probably be leaked, are solved. A simplified authorization process is provided, to perform a predetermined operation that may be completed using the wearable device 120. Thus, user's property and privacy may be effectively protected, and the user security of the mobile internet may be improved.

Also, an authorization code may be acquired by the wearable device 120. Thus, the authorization code is not likely to be leaked, since the wearable device participates in the process of acquiring the authorization code. Thus, the user security of the mobile internet may be improved.

Figure 10:
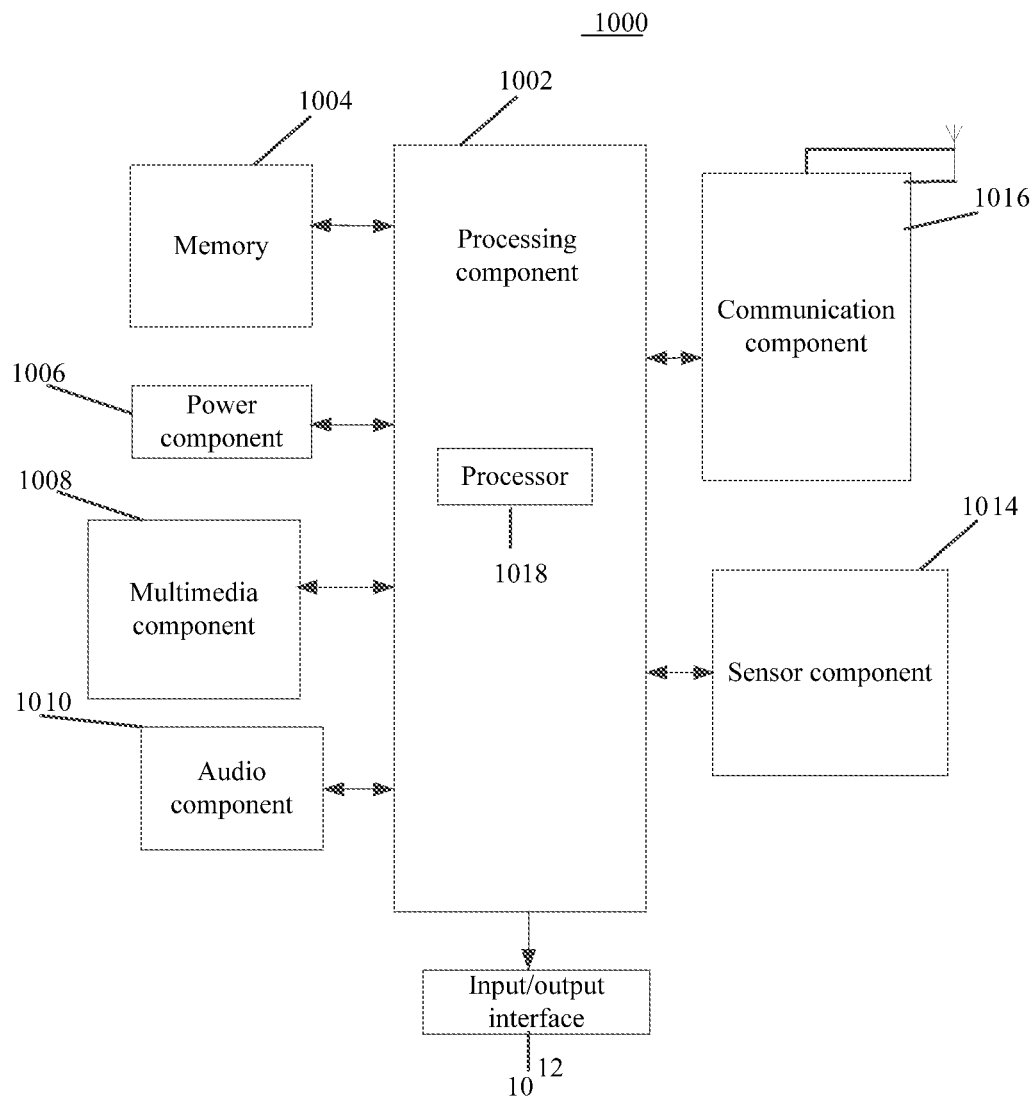
FIG. 10 is a block diagram of an example device for authorizing an operation.

FIG. 10 is a block diagram of a device 1000 for authorizing an operation. The device 1000 may be the mobile terminal 140. For example, the device 1000 may be a mobile phone, a computer, a digital broadcast terminal, a messaging device, a gaming console, a tablet, a medical device, an exercise equipment, a personal digital assistant, and the like.

Referring to FIG. 10, the device 1000 may include at least one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 may control overall operations of the device 1000, such as the operations associated with display, telephone calls, data communications, camera operations, and recording operations. The processing component 1002 may include one or more processors 1018 to execute instructions to perform all or part of the steps in the above described methods. Moreover, the processing component 1002 may include one or more modules which facilitate the interaction between the processing component 1002 and other components. For instance, the processing component 1002 may include a multimedia module to facilitate the interaction between the multimedia component 1008 and the processing component 1002.

The memory 1004 may store various types of data to support the operation of the device 1000. Examples of such data include instructions for any applications or methods operated on the device 1000, contact data, phonebook data, messages, pictures, video, etc. The memory 1004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1006 may provide power to various components of the device 1000. The power component 1006 may include a power management system, one or more power sources, and any other components associated with the generation, management, and distribution of power in the device 1000.

The multimedia component 1008 may include a screen providing an output interface between the device 1000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In an example, the multimedia component 1008 may include a front camera and/or a rear camera. The front camera and the rear camera may receive an external multimedia datum while the device 1000 is in an operation mode, such as a photographing mode or a video mode. Each of the front camera and the rear camera may be a fixed optical lens system or have focus and optical zoom capability.

The audio component 1010 may output and/or input audio signals. For example, the audio component 1010 may include a microphone ("MIC") configured to receive an external audio signal when the device 1000 is in an operation mode, such as a call mode, a recording mode, and a voice recognition mode. The received audio signal may be further stored in the memory 1004 or transmitted via the communication component 1016. In an example, the audio component 1010 may further includes a speaker to output audio signals.

The I/O interface 1012 may provide an interface between the processing component 1002 and peripheral interface modules, such as a keyboard, a click wheel, buttons, and the like. The buttons may include, but are not limited to, a home button, a volume button, a starting button, and a locking button.

The sensor component 1014 may include one or more sensors to provide status assessments of various aspects of the device 1000. For instance, the sensor component 1014 may detect an open/close status of the device 1000, relative positioning of components, e.g., the display and the keypad, of the device 1000, a change in position of the device 1000 or a component of the device 1000, a presence or absence of user contact with the device 1000, an orientation or an acceleration/deceleration of the device 1000, and a change in temperature of the device 1000. The sensor component 1014 may include a proximity sensor configured to detect the presence of nearby objects without any physical contact. The sensor component 1014 may also include a light sensor, such as a CMOS or CCD image sensor, for use in imaging applications. In some embodiments, the sensor component 1014 may also include an accelerometer sensor, a gyroscope sensor, a magnetic sensor, a pressure sensor, or a temperature sensor.

The communication component 1016 may facilitate communication, wired or wirelessly, between the device 1000 and other devices. The device 1000 may access a wireless network based on a communication standard, such as WiFi, 2G, or 3G, or a combination thereof. In one exemplary embodiment, the communication component 1016 may receive a broadcast signal or broadcast associated information from an external broadcast management system via a broadcast channel. In an example, the communication component 1016 may further include a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an example, the device 1000 may be implemented with one or more application specific integrated circuits (ASIC), digital signal processors (DSP), digital signal processing devices (DSPD), programmable logic devices (PLD), field programmable gate arrays (FPGA), controllers, micro-controllers, microprocessors, or other electronic components, for performing the method for authorizing an operation as shown in FIG. 2 or 4A.

In an example, there is also provided a non-transitory computer-readable storage medium including instructions, such as included in the memory 1004, executable by the processor 1018 in the device 1000, for performing the above-described methods. For example, the non-transitory computer-readable storage medium may be a ROM, a RAM, a CD-ROM, a magnetic tape, a floppy disc, an optical data storage device, and the like.

Figure 11:
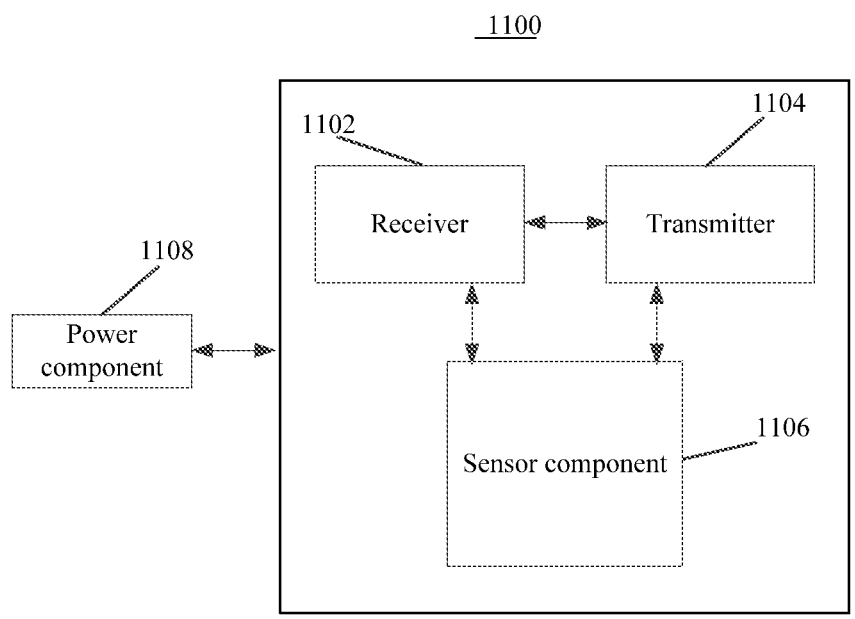
FIG. 11 is a block diagram of an example device for authorizing an operation.

FIG. 11 is a block diagram of another example device 1100 for authorizing an operation. The device 1100 is, for example, the wearable device 120. For example, the device 1100 may be a smart wristband, a smart watch, a smart bracelet, a smart necklace, a smart ring, a smart glass or the like. Referring to FIG. 11, the device 1100 may include at least the following one or more components: a receiver 1102, a transmitter 1104, a sensor component 1106 and a power component 1108.

The receiver 1102 may be circuitry that receives signal from transmission medium, and decodes the received signal or converts them for driving the device 1100. In the device 1100, the transmission medium may be a wireless form.

The transmitter 1104 may be circuitry that receives signal or data and converts them into wireless transmission medium. The transmitter 1104 may send radio waves via an antenna to support operations of the device 1100. The transmitter 1104 may generate alternating currents which act on the antenna. The antenna may generate radio waves and send the signals for reception by a destination device. The transmitter 1104 thus facilitates communication using radio waves or any other wireless communication medium.

The receiver 1102 and the transmitter 1104 may communicate based on a communication protocol such as Bluetooth 4.0 or any other predetermined communication protocol.

The sensor component 1106 may includes one or more sensors to provide status assessments of various aspects of the device 1100. For example, the sensor component 1106 may detect an open/close status of the device 1100, or relative positioning of components. For example, the sensor component 1106 may detect an orientation or an acceleration/deceleration of the device 1100, a change in temperature of the device 1100, or any other physical condition. The sensor component 1106 may include a proximity sensor that detects the presence of nearby objects without any physical contact. The sensor component 1106 may also include a light sensor, an accelerometer sensor, a gyroscope sensor, a magnetic sensor, a pressure sensor, a temperature sensor, and other types of sensors or a combination thereof.

The power component 1108 may provide power to various components of the device 1100. The power component 1108 may include a power management system, one or more power sources, and any other components associated with the generation, management, and distribution of power in the device 1100.

In an exemplary embodiment, the device 1100 may perform the methods for authorizing an operation as described throughout the present document.

The system may be implemented in many different ways. Each module, such as the data acquiring module 620, the match detecting module 640, and the operation performing module 660, among various other modules described, may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory, for example, that comprises instructions executable with a processor to implement one or more of the features of the module. When any one of the module includes the portion of the memory that comprises instructions executable with the processor, the module may or may not include the processor. In some examples, each module may just be the portion of the memory that comprises instructions executable with the processor to implement the features of the corresponding module without the module including any other hardware. Because each module includes at least some hardware even when the included hardware comprises software, each component may be interchangeably referred to as a hardware component, such as the data acquiring hardware, the match detecting hardware, and the operation performing module hardware.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device. However, the computer readable storage medium is not a transitory transmission medium for propagating signals.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program or apparatus. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of" A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

All of the discussion, regardless of the particular implementation described, is exemplary in nature, rather than limiting. For example, although selected aspects, features, or components of the implementations are depicted as being stored in memories, all or part of the system or systems may be stored on, distributed across, or read from other computer readable storage media, for example, secondary storage devices such as hard disks, flash memory drives, floppy disks, and CD-ROMs. Moreover, the various components and screen display functionality is but one example of such functionality and any other configurations encompassing similar functionality are possible.

While various embodiments have been described, it will be apparent to those of ordinary skill in the art that many more embodiments and implementations are possible. Accordingly, the embodiments described herein are examples, not the only possible embodiments and implementations.

What is claimed is:

1. A method for authorizing an operation the method comprising:

acquiring, by a mobile terminal, motion data collected by a wearable device;

comparing, by the mobile terminal, the motion data with a physical motion for verification;

in response to the motion data matching with the physical motion for verification, authorizing the mobile terminal to perform a predetermined operation corresponding to the physical motion for verification; and when the predetermined operation includes an operation performed interactively with a server, acquiring an authorization code from the wearable device, and performing the predetermined operation interactively with the server by using the authorization code, wherein acquiring the authorization code from the wearable device comprises:

acquiring, by the mobile terminal, an encrypted authorization code from the server;

sending, by the mobile terminal, the encrypted authorization code to the wearable device; and acquiring, by the mobile terminal, the authorization code decrypted by the wearable device.

2. The method according to claim 1, wherein acquiring the authorization code from the wearable device comprises:

acquiring, by the mobile terminal, the authorization code that is generated independently by the wearable device.

3. The method according to claim 1, wherein, acquiring the motion data collected by the wearable device, comprises:

if a preset physical motion for verification exists, directly acquiring the motion data collected by the wearable device;

or, if a preset physical motion for verification does not exist, dynamically generating the physical motion for verification; prompting a user about the physical motion for verification; and after the prompting about the physical motion for verification, acquiring the motion data collected by the wearable device.

4. The method according to claim 1, further comprising:

storing the physical motion for verification, and a predetermined operation corresponding to the physical motion for verification.

5. The method according to claim 1, further comprising:

establishing, by the mobile terminal, a binding relationship with the wearable device, wherein establishing the binding relationship with the wearable device comprises:

acquiring, by the mobile terminal, another motion data from the wearable device; comparing said another motion data with a physical motion for binding; and if said another motion data matches the physical motion for binding, establishing the binding relationship with the wearable device; or, scanning, by the mobile terminal, a two-dimensional identification code of the wearable device, wherein the two-dimensional identification code is representative of an identification of the wearable device, sending, by the mobile terminal, the identification of the wearable device and a device identification of the mobile terminal to a server, the server being configured to establish the binding relationship between the wearable device and the mobile terminal based on the identification of the wearable device and the device identification of the mobile terminal; or, sending, by the mobile terminal, the identification of the wearable device and a user account to the server, the server being configured to bind the wearable device and the user account based on the identification of the wearable device, and establish the binding relationship between the wearable device and the mobile terminal using the user account.

6. A method for authorizing an operation, the method implemented by a wearable device, and the method comprising:

collecting motion data;

sending the motion data to a mobile terminal, the mobile terminal being configured to determine whether the motion data matches with a physical motion for verification; and in response to the motion data being matched with the physical motion for verification, authorizing the mobile terminal to perform a predetermined operation corresponding to the physical motion for verification; and in response to the motion data being matched with the physical motion for verification, providing an authorization code to the mobile terminal, the mobile terminal being configured to perform the predetermined operation interactively with a server by using the authorization code, wherein providing the authorization code to the mobile terminal comprises:

receiving, by the wearable device, an encrypted authorization code from the mobile terminal, wherein the encrypted authorization code is acquired by the mobile terminal from the server; decrypting, by the wearable device, the encrypted authorization code to obtain a decrypted authorization code; and sending the decrypted authorization code to the mobile terminal.

7. The method according to claim 6, wherein providing the authorization code to the mobile terminal comprises:

generating the authorization code, and sending the authorization code to the mobile terminal.

8. The method according to claim 6, further comprising:

establishing a binding relationship with the mobile terminal, wherein, establishing the binding relationship with the mobile terminal comprises:

collecting another motion data; and sending said another motion data to the mobile terminal, the mobile terminal being configured to compare said another motion data with a physical motion for binding; and in response to said another motion data being matched with the physical motion for binding, establishing, by the wearable device, the binding relationship with the mobile terminal.

9. A mobile terminal for authorizing an operation, the mobile terminal comprising:

a processor; and a memory for storing instructions executable by the processor;

wherein the processor is configured to:

acquire motion data collected by a wearable device;

compare the motion data with a physical motion for verification;

in response to the motion data being matched with the physical motion for verification, authorize the mobile terminal to perform a predetermined operation corresponding to the physical motion for verification;

when the predetermined operation includes an operation performed interactively with a server, acquire an authorization code from the wearable device, and perform the predetermined operation interactively with the server by using the authorization code;

acquire an encrypted authorization code from the server; send the encrypted authorization code to the wearable device; and acquire an authorization code decrypted by the wearable device.

10. The mobile terminal according to claim 9, wherein the processor is further configured to:

acquire the authorization code that is generated independently by the wearable device.

11. The mobile terminal according to claim 9, wherein the processor is further configured to:

acquire the motion data collected by the wearable device if a preset physical motion for verification exists; or, dynamically generate the physical motion for verification if the preset physical motion for verification does not exist, display a prompt about the physical motion for verification; and after the prompt about the physical motion for verification, acquire the motion data collected by the wearable device.

12. The mobile terminal according to claim 9, wherein the processor is further configured to:

store the physical motion for verification, and a predetermined operation corresponding to the physical motion for verification.

13. The mobile terminal according to claim 9, wherein the processor is further configured to establish a binding relationship with the wearable device, wherein establishment of the binding relationship comprises:

acquisition of another motion data from the wearable device, comparison of said another motion data with a physical motion for binding, and if said another motion data matches with the physical motion for binding, establishment of the binding relationship with the wearable device; or, acquisition of a scan of a two-dimensional identification code of the wearable device, wherein the two-dimensional identification code is representative of an identification of the wearable device, transmission of the identification of the wearable device and a device identification of the mobile terminal to a server, the server being configured to establish the binding relationship between the wearable device and the mobile terminal according to the identification of the wearable device and the device identification of the mobile terminal; or, transmission of the identification of the wearable device and a user account to the server, the server being configured to bind the wearable device and the user account according to the identification of the wearable device, and establishment of the binding relationship between the wearable device and the mobile terminal using the user account.

14. A wearable device for authorizing an operation, the wearable device comprising:

a processor; and a memory for storing instructions executable by the processor;

wherein the processor is configured to:

collect motion data;

provide the motion data to a mobile terminal, the mobile terminal being configured to compare the motion data with a physical motion for verification, and in response to the motion data being matched with the physical motion for verification, authorize a predetermined operation corresponding to the physical motion for verification; and provide an authorization code to the mobile terminal in response to the motion data being matched with the physical motion for verification, the authorization code enables the mobile terminal to perform the predetermined operation interactively with a server by using the authorization code; and in response to the motion data being matched with the physical motion for verification, receive an encrypted authorization code acquired by the mobile terminal from the server, decrypt the encrypted authorization code to obtain a decrypted authorization code, and send the decrypted authorization code to the mobile terminal.

15. The wearable device according to claim 14, wherein the processor is further configured to:

generate the authorization code, and send the authorization code to the mobile terminal.

16. The wearable device according to claim 14, wherein the processor is further configured to establish a binding relationship with the mobile terminal, wherein establishment of the binding relationship comprises:

collection of another motion data; and transmission of said another motion data to the mobile terminal, the mobile terminal being configured to compare said another motion data with a physical motion for binding, and in response to said another motion data being matched with the physical motion for binding, establishment of the binding relationship with the mobile terminal.

* * * * *